United States Patent [19]

Lupke

[11] Patent Number: 4,681,526

[45] Date of Patent: Jul. 21, 1987

[54] APPARATUS FOR MOLDING THERMOPLASTIC PIPES

[76] Inventor: Manfred A. A. Lupke, 92 Elgin St., Thornhill, Ont., Canada, L3T 1W6

[21] Appl. No.: 849,850

[22] Filed: Apr. 9, 1986

[51] Int. Cl.⁴ .............................................. B29C 51/24
[52] U.S. Cl. ................................. 425/532; 425/326.1; 425/336; 425/370; 425/377; 425/387.1
[58] Field of Search ..................... 425/326.1, 335, 336, 425/337, 370, 363, 327, 532, 538, 539, 330, 387.1, 233, 342.1, 343

[56] References Cited

U.S. PATENT DOCUMENTS

| | | | |
|---|---|---|---|
| 2,866,230 | 12/1958 | Holte | 425/370 |
| 3,280,430 | 10/1966 | Antrobus | 425/370 |
| 3,981,663 | 9/1976 | Lupke | 425/539 |
| 4,212,618 | 7/1980 | Hegler et al. | 425/326.1 |
| 4,504,206 | 3/1985 | Lupke et al. | 425/326.1 |

Primary Examiner—Willard E. Hoag

[57] ABSTRACT

An apparatus for molding externally ribbed and corrugated thermoplastic pipes, including a pipe die for extruding a parison of a thermoplastic material; mold-block halves circulating in endless paths and cooperating with each other to form a travelling mold; and a means withstanding the hydraulic pressure of molding. The means is represented by yokes having shanks for engagement with complimentary recesses made in the halves. The yokes are provided with rollers guided in parallel paths ensuring that the shanks are driven toward and away from the recesses in a progressive motion without changing their orientation.

4 Claims, 4 Drawing Figures

4,681,526

APPARATUS FOR MOLDING THERMOPLASTIC PIPES

BACKGROUND OF THE INVENTION

This invention relates to apparatus for molding thermoplastic pipes, externally ribbed or corrugated.

Known such apparatus (U.S. Pat. Nos. 3,998,579, 4,021,178 and 4,504,206) include a pipe die for extruding a parison of a thermoplastic material, and moldblock halves circulating in an endless path containing a straight forward run wherein the halves cooperate with each other in the directions of their circulation and perpendicularly to the latter, to form a travelling mold for the thermoplastic pipe, a return run and two semi-circumferential guide tracks for transferring the halves between said runs.

The apparatus of the first known patent is particularly adapted to produce externally ribbed pipes. That is why it has a means for withstanding the hydraulic pressure of molding acting to separate the halves in the straight forward run in said perpendicular direction.

In that apparatus said means constitutes two guiding rails biased toward each other by means of springs. The drawback of such a design lies in extremely high loads and wear in the rails since the hydraulic pressure of the injection molding acts in the frame-springs-rail-halves-rail-frame zone. Also, the patent does not states whether the halves are independent (chainless) or are parts of chains. The chainless apparatus with independent halves (described in the next two patents) are designed for molding of corrugated pipes and do not have said means and, in addition, cannot withstand the hydraulic pressure of molding acting to separate the halves in the direction of their circulation. That is why, such apparatus cannot be used successfully in the molding of externally ribbed pipes.

Similar problems can arise in blow molding of extremely large corrugated pipes.

SUMMARY OF THE INVENTION

The objective of the present invention is to overcome the above drawbacks of the known appartus.

For this the frame and guides are unloaded from the pressure by means of yokes fixing the halves to each other. Thus, in the present invention the hydraulic pressure acts only in the halves-yokes-halves zone. The means for withstanding the hydraulic pressure is represented by two endless series of circulating yokes having shanks for engagement along said travelling mold with complimentary recesses made in the halves. The yokes withstand the pressure in both said directions.

The yokes are provided with rollers, said series being supplied with a track having appropriate upstream, downstream, forward and return sections for guiding said rollers in such a manner that in the upstream and downstream sections the shanks are driven toward and away from the recesses in a progressive motion without changing their orientation and without their undercutting, and are engaged with the recesses in the forward section.

The upstream and downstream sections have separate parallel guiding paths ensuring said progressive motion.

To render justice, it should be noted that the objective of creating progressive motion is known in the art of corrugators for driving the halves (U.S. Pat. Nos. 4,021,178 and 4,504,206).

A more complete appreciation of the present invention and the distinguishing characteristics, objectives and attendant advantages thereof set out herein are more apparent and obvious to one ordinary skilled in the art from the following detailed description, drawings and appended claims.

DESCRIPTION OF THE PREFERRED EMBODIMENT

Figure 1:
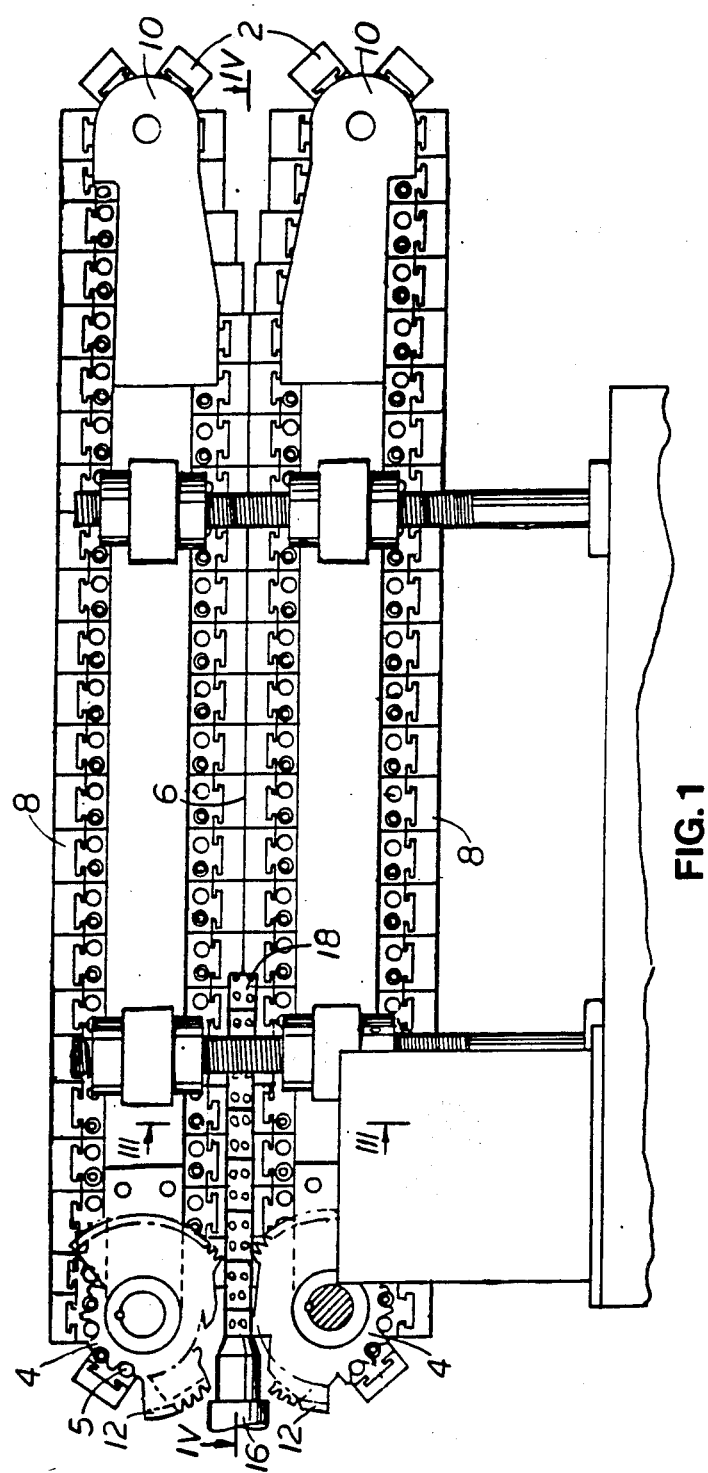
FIG. 1 is an apparatus of the present invention, a side view.
Figure 2:
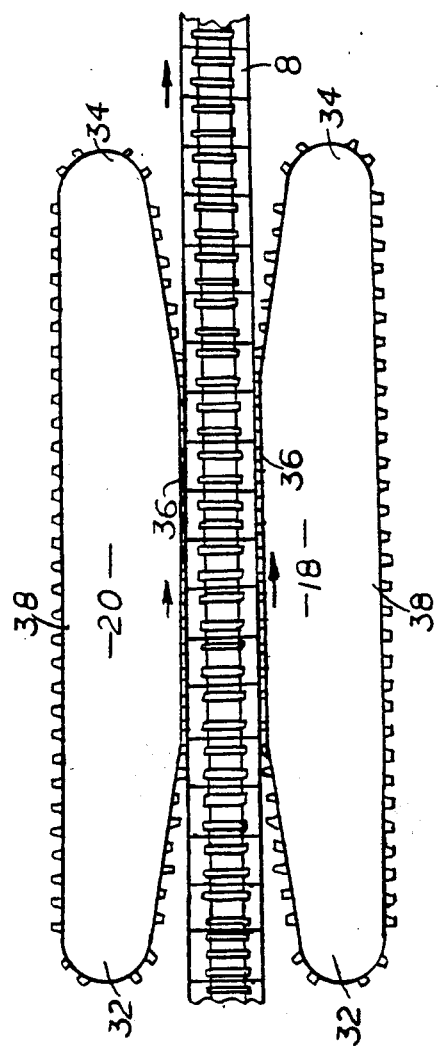
FIG. 2 is the same as above, a plan view elevation of circulating yokes series.
Figure 3:
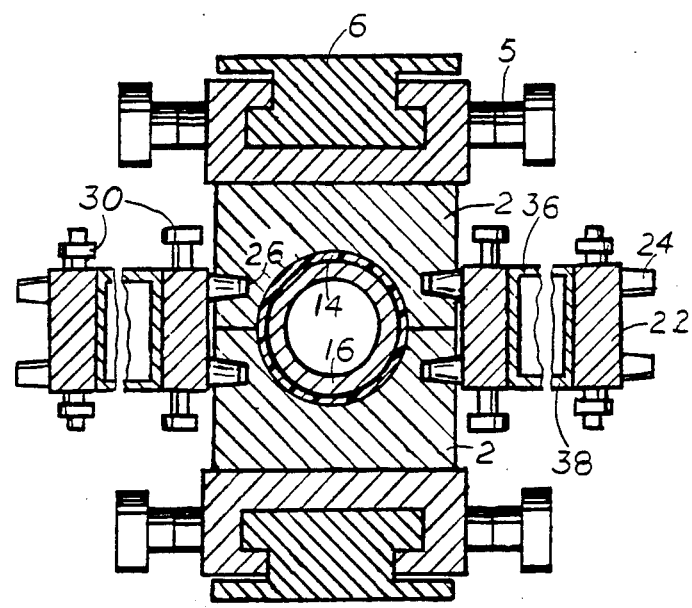
FIG. 3 is a section along line III—III of FIG. 1.

Referring now to the drawings, the apparatus of the present invention includes two trains of moldblock halves 2 driven in an endless paths by means of sprockets 4 engaged with roller pins 5 of the halves 2. The paths have straight forward (6) and return (8) runs and semi-circumferential guide tracks 10 and 12 for transferring the halves 2 between the runs 6 and 8. The halves 2 are adjacent to each other in the runs 6 and 8 and cooperate with those of the opposite path in the run 6 to form travelling mold for the produced thermoplastic pipe 14 extruded from a pipe die 16.

It should be mentioned that the above design corresponds basically to the corrugator described in my U.S. Pat. No. 4,504,206.

The straight forward runs 6 is provided with an upstreamly located series 18 and 20 of circulating yokes 22 having shanks 24 for engagement along the travelling mold with complimentary recesses 26 made in the halves 2. The yokes 22 are provided with rollers 30.

The series 18 and 20 have upstream (32), downstream (34), forward (36) and return (38) sections, the sections 32 and 34 being provided with separate parallel guiding paths 40 and 42.

Figure 4:
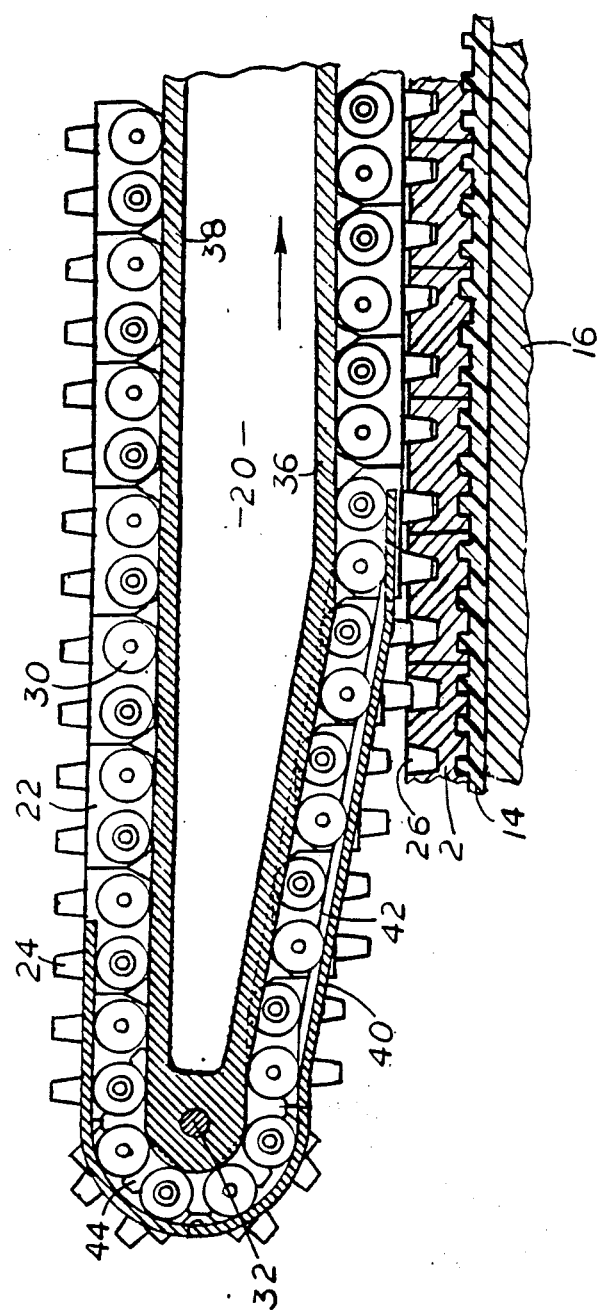
FIG. 4 is a section exploded along line IV—IV of FIG. 1.

It is clearly understood that a person skilled in the art could apply the same structure with different options. For example, the shanks can be conical or cylindrical, can belong to the halves (in which case the complimentary recesses are made in the yokes), the upstream and/or downstream sections can be provided with a rotary transfer (shown as a sprocket 44 in FIG. 4), the series can be represented by a chain, etc.

In operation, an extrudate of the thermoplastic material flows from the die 16 into the travelling mold. The hydraulic pressure of the melt acting to separate the halves 2 in the run 6 is accepted by yokes 22 engaged with the recesses 26 in the forward section 36, no forces being transferred farther the halves. The paths 40 and 42 guide the shanks 24 in the upstream and downstream sections 32 and 34 appropriately in such a manner that they are driven toward and away from the recesses 26 in a progressive motion without changing their orientation. This allows to avoid mutual undercutting of the shanks and recesses.

Although the present apparatus is directed mostly to externally ribbed pipes production (the process being close to injection molding), in rare cases the apparatus may be applied to withstand the blow pressure in blow molding of extremely large pipes.

While there has been described and pointed out the fundamental novel feature of the invention as applied to the preferred embodiment, it is to be understood that this description is exemplary and explanatory, but not restrictive, the invention being not limited to the specific details shown and described. Various departures, omissions, substitutions and changes may be made by the skilled in the art without departing from the scope of the invention and without sacrificing its chief advantages. Obviously, many modifications and variations of the present invention are possible in light of the above teaching. It is therefore to be understood that within the scope of the appended claims, the present invention may be practiced otherwise than as specifically described herein.

What is claimed is:

1. In an apparatus for molding externally ribbed and corrugated thermoplastic pipes, including:
    a pipe die for extruding a parison of a thermoplastic material;
    moldblock halves circulating in an endless path containing a straight forward run wherein the halves cooperate with each other in the directions of their circulation and perpendicularly to the latter, to form a travelling mold for the thermoplastic pipe, a return run and two semi-circumferential guide tracks for transferring the halves between said runs;
    a means for withstanding the hydraulic pressure of molding acting to separate the halves in the straight forward run in said perpendicular direction;
    the improvement, wherein in order to avoid high loads and wear in said forward run, said means is (represented by) two endless series of circulating yokes having shanks for engagement along said travelling mold with complimentary recesses made in the halves, and the shanks being engageable with both molds of each cooperating pair of mold halves in recesses therein to hold the mold halves together.

2. An apparatus for molding externally ribbed and corrugated thermoplastic pipes, including:
    a pipe die for extruding a parison of a thermoplastic material;
    moldblock halves circulating in an endless path containing a straight forward run wherein the halves cooperate with each other in the directions of their circulation and perpendicularly to the latter, to form a travelling mold for the thermoplastic pipe, a return run and two semi-circumferential guide tracks for transferring the halves between said runs;
    a means for withstanding the hydraulic pressure of molding acting to separate the halves in the straight forward run in both said directions, the means being (represented by) two endless series of circulating yokes having shanks for engagement along said travelling mold with complimentary recesses made in the halves, and the shanks being engageable with both molds of each cooperating pair of mold halves in recesses therein to hold the mold halves together.

3. The apparatus of claims 1 and 2 wherein said yoke is provided with rollers, said series being supplied with a track having appropriate upstream, downstream, forward and return sections for guiding said rollers in such a manner that in the upstream and downstream sections the shanks are driven toward and away from the recesses in a progressive motion without changing their orientation and without their undercutting, and are engaged with the recesses in the forward section.

4. The apparatus of claim 3 wherein the upstream and downstream have separate parallel guiding paths ensuring said progressive motion.

* * * * *